United States Patent Office 3,117,958
Patented Jan. 14, 1964

3,117,958
BLEACH-FAST, FIBER-REACTIVE YELLOW MONOAZO DYES
Roy Emerson Starn, Jr., and William Henry Gumprecht, Wilmington, Del., assignors to E. I. du Pont de Nemours and Company, Wilmington, Del., a corporation of Delaware
No Drawing. Filed Mar. 23, 1959, Ser. No. 800,931
5 Claims. (Cl. 260—153)

This invention relates to bleach-fast, fiber reactive yellow dyes and constitutes an improvement upon the invention described and claimed in the copending application of one of us (Starn), Serial No. 772,425, filed November 7, 1958, now U.S. Patent No. 3,040,022.

It is an object of this invention to provide bleach-fast, fiber-reactive, yellow dyes of high tinctorial strength and of a redder shade of yellow than those obtainable according to said copending application. Other objects and achievements of this invention will appear as the description proceeds.

In said application Serial No. 772,425, now U.S. Patent No. 3,040,022, are described novel, fiber-reactive dyes of the general formula

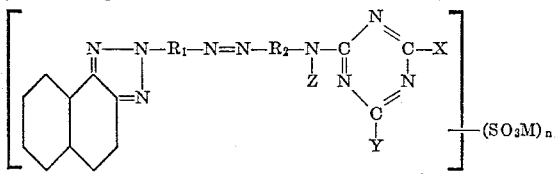

wherein $R_1$ and $R_2$ are benzenoid radicals bearing optional substituents, as there set forth, Z is a radical of the group consisting of $CH_3$ and $C_2H_5$, X is a halogen atom, and Y is halogen or another substituent as there defined. These dyes produce dyeings ranging in shade from greenish yellow to yellow and characterized by outstanding fastness to bleach, even at chlorine concentrations of 0.3%.

We have now found that bleach-fast dyes of a redder shade of yellow and having greater tinctorial strength are obtained if the $R_1$ radical in the above general formula is replaced by the p,p'-radical of o,o'-disulfo-stilbene. In other words, the novel fiber-reactive dyes of this invention are expressed by the general formula

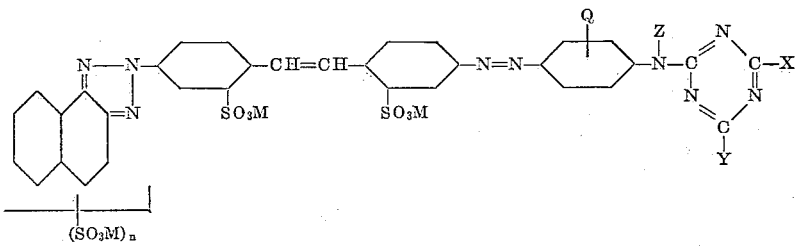

wherein $n$ is 1 to 3; M is an alkali-metal; Q is a non-ionic substituent of the group H, Cl, alkyl, O-alkyl; Z is $CH_3$ or $C_2H_5$; X is Cl or Br; and Y is Cl, Br, O-alkyl, S-alkyl, $NH_2$, monoalkylamino, dialkylamino, monoalkanolamino, dialkanolamino, arylamino, N-alkyl-arylamino, and arylamino radicals bearing water-solubilizing groups, the alkyls and alkanols in these definitions of Q and Y being radicals of 1 to 4 C-atoms, and the aryls in the definition of Y having not more than 10 C-atoms in their cyclic structure.

It will be noted that the novel dyes of this invention possess the following characteristics in their structure: They are monoazo dyes, having a triazine radical which bears at least one halogen atom (Cl or Br); they possess a 1,2-naphthotriazole radical; one of the N-atoms of the triazole ring is attached to a 2,2'-disulfo-stilbene radical; the second component of the azo dye is a benzenoid component by means of a secondary amine radical; the entire molecule contains at least 3 and up to 6 or 7 sulfo groups, of which at least one is located in the naphthalene nucleus, and the dye chromophore, that is, the dye molecule exclusive of the triazine ring and its substituents, is free of OH and $NH_2$ groups.

In addition to possessing outstanding fastness to bleach, the dyeings produced by our novel dyes possess other desirable qualities, such as good fastness to light and good fastness to after-treatment with textile-finishing resins (such as crease-proofing or fiber-setting resins).

Generally speaking, our novel compounds are synthesized by preparing first, in conventional manner, an amino-stilbene-naphthotriazole compound of the formula

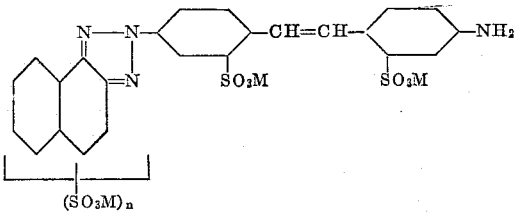

wherein M is an alkali-metal and $n$ is an integer from 1 to 3. See, for instance, U.S.P. 2,029,591. This compound is then diazotized and coupled to a secondary arylamine of the formula

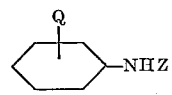

wherein Q and Z are as above defined, and the aminoazo dye thus obtained is then condensed with a dihalogeno- or tri-halogeno-triazine compound of the formula

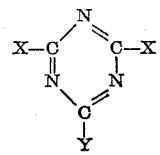

wherein X and Y are defined as above.

When Y is halogen, the said condensation is effected at ice temperatures (0° to 5° C.) in aqueous medium, whereby the resulting end product possesses two halogen atoms on the triazine ring. But if the reactive dye is to contain only one halogen in the triazine ring, either one of two routes may be resorted to: (a) reaction of the aminoazo compound, mole per mole, with a cyanuric halide, followed by reaction with one mole of a compound which forms a Y group other than halogen, or (b) first reacting a compound of the latter group, mole per mole, with a cyanuric halide, followed by reaction with one mole of the aminoazo dye. In either route, the reaction with cyanuric halide is effected at ice temperatures (0° to 5° C.) in aqueous medium, and the second halogen atom on the triazine ring is reacted at a temperature in the range of 10° to 70° C., likewise in aqueous medium.

The compounds which are employed to form the Y group other than halogen are, for instance, a lower alcohol (1 to 4 C-atoms), a lower mercaptan, a monoalkylamine, a dialkylamine, an alkanolamine, an arylamine, an N-alkyl-arylamine, or an aryl- or N-alkylarylamine bearing from 1 to 3 water-solubilizing groups (e.g. $SO_3H$ or $COOH$).

The final dye is generally salted out with common salt; hence its sulfo groups have the form $SO_3Na$. It may, however, be also recovered, in known manner, in the form of a potassium or lithium salt, or it may be converted into one or the other of these salts, in known manner, after isolation in the form of sodium salt.

Without limiting this invention, the following examples are given to illustrate our preferred mode of operation. Parts mentioned are by weight.

*Example 1*

A quantity of the trisodium salt of an amino-stilbene compound of the formula

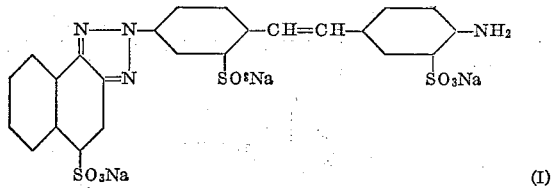
(I)

was prepared in the conventional manner (see, for instance Example 3 of U.S.P. 2,029,591), using sodium hypochlorite in strongly alkaline solution for oxidation to the triazole (see, for instance, Example 1 of U.S.P. 2,713,055).

To a solution of 133.8 parts of said amino-stilbene compound (I) and 15.2 parts of sodium nitrite in 2,000 parts of water at pH 7 and at 0° to 5° C., was added 60 parts of 10 N hydrochloric acid. After stirring for one hour at 0° to 5° C. the excess nitrous acid was removed with sulfamic acid. To the resulting diazonium slurry, 21.9 parts of N-methylaniline were added; the mass was stirred at 0° to 5° C. for one hour; its pH was adjusted to 2.5 with 10 N NaOH, and the mixture was further stirred overnight at room temperature. The resulting slurry, containing the azo compound of Formula II,

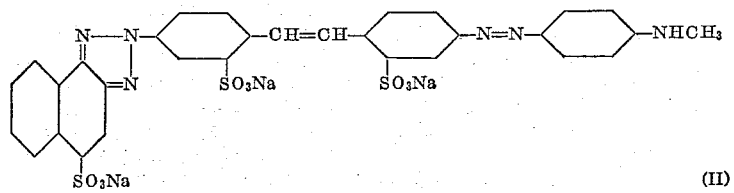

(II)

was divided into two equal portions.

A solution was prepared by dissolving 30.8 parts of sodium metanilate in 300 parts of water and adjusting the pH to 6.5. To this solution at 0° to 5° C. was added 27.6 parts of cyanuric chloride in 122 parts of acetone.

40 parts of 2 N sodium carbonate were added, to maintain the pH at 4 to 6. The resultant solution of primary condensation product of sodium metanilate and cyanuric chloride was added to one portion of the slurry of the methylamino compound (II), which had previously been adjusted to pH 6.5 and heated to 50° to 55° C. 2 N sodium carbonate was added, as needed, to maintain the pH at 4 to 6 until the pH remained constant for 15 minutes. The slurry was then adjusted to pH 6.5 at 50° to 55° C., and sufficient NaCl was added to produce a 10% NaCl solution by volume. The product was filtered off and dried. The isolated product is a reactive dye, and is believed to have the structure

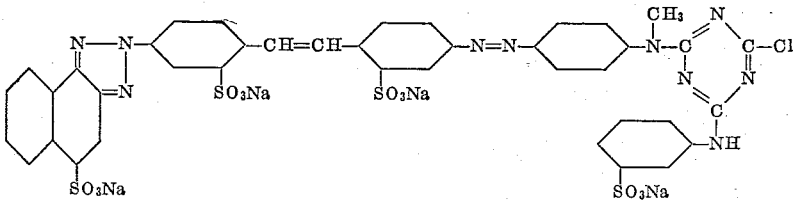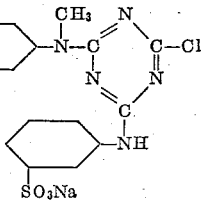

It is a brown powder, which dissolves in water to give a yellow solution. When applied to cotton broadcloth from an aqueous bath by the method described in Example 7 hereinbelow, it exhibits a bright yellow shade having excellent light and wash fastness, and having outstanding fastness to chlorine bleach and peroxide.

*Example 2*

A solution was prepared by dissolving 39.7 parts 2-amino-p-benzenedisulfonic acid in 260 parts of water and adjusting the pH to 6.5. To this solution at 0° to 5° C. was added 27.6 parts of cyanuric chloride in 122 parts of acetone. 40 parts of 2 N sodium carbonate were added, as needed, to maintain the pH at 4 to 6. The resultant solution of primary condensation product of 2-amino-p-benzenedisulfonic acid and cyanuric chloride was added to the remaining portion of the slurry of the methylamino compound (II), of Example I which had previously been adjusted to pH 6.6 and heated to 50° to 55° C. The remainder of the procedure was as in Example 1, and the isolated product is believed to have the structure:

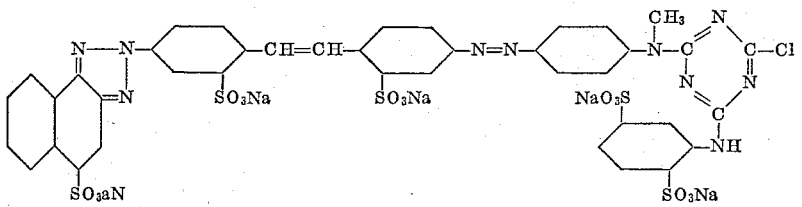

It is a yellow-brown powder, which gives a shade on cotton very similar to that obtained from the dye of Example 1.

*Example 3*

28.0 parts of N-ethyl-m-toluidine were added to an aqueous slurry of the diazonium compound obtained from the amino-stilbene compound (I), obtained as in Example 1, and the mass was stirred at 0° to 5° C. for one hour, adjusted to pH 2 with 10 N NaOH, and stirred overnight at room temperature. The pH of the resulting slurry was adjusted to 6.5, and the mass was heated to 50° to 55° C.

A column of the primary condensation product obtained as in Example 1 from 70.2 parts of sodium metanilate and 64.2 parts of cyanuric chloride, was then added, and 2 N sodium carbonate was added, as needed, to maintain the pH at 4 to 6 until the pH remained constant for 15 minutes. The slurry was then adjusted to pH 6.5 at 50° to 55° C., and sufficient NaCl was added to produce a 10% NaCl solution by volume. The product was filtered off and dried. The isolated product, which is believed to have the structure in lieu of the aniline there mentioned, 21.4 parts of diethanolamine are added here, over a 1 hour period. The rest of the procedure is as in Example 5, and the recovered product has similar dyeing qualities.

In a similar manner, the dichlorotriazine compound of Formula III may be reacted with ammonia, ethanolamine, a lower monoalkyl amine, e.g. methyl, ethyl, butyl or 3-methoxypropylamine, a lower alcohol, e.g. methyl, ethyl

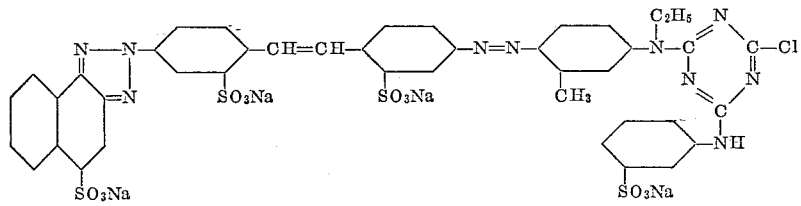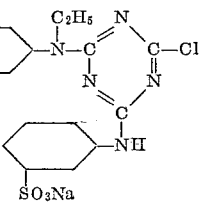

is a brown powder which gives a similar shade on cotton and possesses similar fastness properties as the dye of Example 1.

*Example 4*

The procedure of Example 1 is repeated except that the resulting aqueous slurry of the methylamino compound of Formula II is here treated with 37 parts of cyanuric chloride at 0° to 5° C. There is obtained a reactive dye of the probable structure or butyl alcohol, or an alkyl mercaptan, e.g. ethyl or propyl mercaptan, to replace one of the chlorine atoms with the corresponding —$NH_2$, —NH-alkanol, —NH-alkyl, —O-alkyl or —S-alkyl group, respectively.

*Example 7.—Dyeing Procedure A*

A 4.15% aqueous solution of the reactive dye of Example 1, for instance, is padded on cotton broadcloth at 70° C. to a weight increase of 60% on the fabric. After

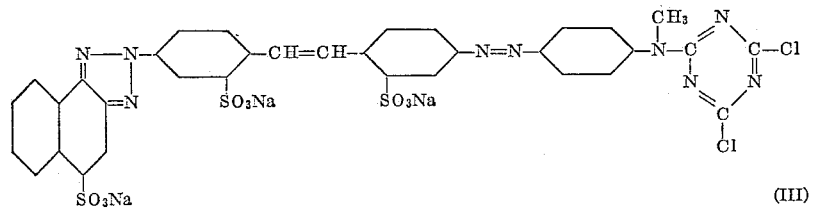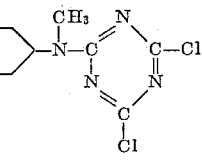

(III)

When applied to cotton broadcloth from an aqueous bath by the method described in Example 8 hereinbelow, it exhibits a shade and fastness properties similar to those of the dye of Example 1.

*Example 5*

196 parts of the dichlorotriazine dye obtained in Example 4 (Formula III), are dissolved in 2000 parts of water, and 18.9 parts of aniline are added while maintaining the pH at 4 to 6 with 2 N sodium carbonate. The reaction mass is stirred at 20° to 25° C. for 3 hours. The resulting condensation product of formula drying, the fabric is repadded in the same manner with a solution which contains 25% sodium chloride and 1.2% sodium hydroxide. The wet fabric is steamed for two minutes and then scoured at the boil for two minutes with a solution containing 0.3% sodium carbonate and 0.2% of the condensation product of 20 moles of ethylene oxide with one mole of a $C_{18}$ alcohol. The fabric is then rinsed and dried.

*Example 8.—Dyeing Procedure B*

The dichlorotriazine dye of Example 4 (Formula III) is applied to cotton broadcloth in exactly the same man-

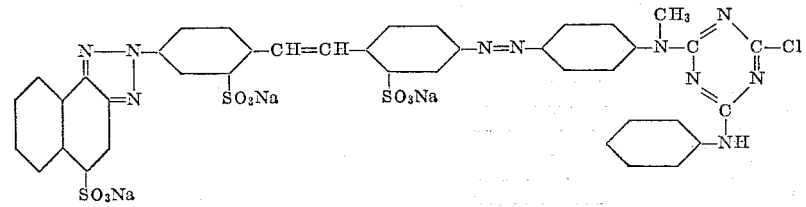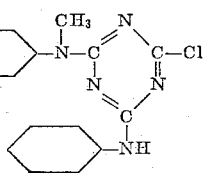

is salted out, filtered off, and dried. When applied to cotton broadcloth by the procedure of Example 7 below, it produces dyeings of similar shade and fastness qualities as the product of Example 1.

In a similar manner, the dichlorotriazine dye of Example 4 may be reacted with other arylamines and N-alkylarylamines, e.g. the o-, m-, or p-toluidines or N-methyl (or N-ethyl)toluidines, to replace one of the chlorine atoms with the corresponding —NH-aryl or —N(alkyl)aryl group.

*Example 6*

The procedure of Example 5 is repeated except that ner as described in Example 7, except that the dye solution is padded at room temperature (20° to 25° C.). The subsequent repadding, steaming, scouring, etc., are done in the same manner as in Example 7.

It will be understood that the details of the above invention may be varied widely without departing from the spirit of this invention. Thus, in the preparation of the amino-stilbene compound (I) in Example 1, the 4-amino-1-naphthalene-sulfonic acid may be replaced by other ortho-coupling aminonaphthalene-sulfonic acids, for instance, 6-amino-2-naphthalene-sulfonic acid, 8-amino-1,-5-naphthalene-disulfonic acid and its 8,2,5 and 8,3,5 isomers; 7-amino-1,3-naphthalene-disulfonic acid and its 7,-1,5 isomer; or 8-amino-1,3,6-naphthalene-trisulfonic acid.

Likewise, in Example 1, the 21.9 parts of N-methylaniline may be replaced by 27.4 parts of N-methyl-2,5-xylidine or by the equivalent amounts, respectively, of N-methyl-o-toluidine, N-methyl-o-chloroaniline, N-methyl-o-anisidine or the corresponding meta compounds.

In the primary condensation products of cyanuric chloride with sodium metanilate (Examples 1 and 3) or 2-amino-p-benzenedisulfonic acid (Example 2), the named aromatic amines may be replaced by equivalent quantities of aniline; toluidine; chloraniline; aniline derivatives containing sulfo or carboxy groups in any of the o, m, or p positions; 1-amino-4-naphthalene-sulfonic acid; 1-amino-4,8-naphthalene-disulfonic acid; and the like.

It will be noted that according to this invention the initial aminostilbene-naphthotriazole compound may be so chosen as to have from 3 to 5 sulfo groups in its structure. The substituent Y on the triazine ring may also possess a plurality of sulfo or carboxy groups. It is recommended, however, to choose Y so that the final dye shall contain no more than 7 such solubilizing groups.

It will be clear at this point that our invention provides novel dyes having valuable practical properties. Thus—

The novel dyes of this invention are useful as reactive dyes for materials possessing exchangeable hydrogen atoms, e.g., textile fibers especially celluosic fibers, wool, silk, nylon and similar materials, including paper, leather, plastic film, etc., which contain radicals such as OH, ONa or $NH_2$.

The new reactive dyes are yellow in shade and are characterized particularly by high tinctorial strength and good fastness to bleaching solutions which contain considerable amounts of chlorine (0.3%).

Other desirable properties, in addition to excellent wash-fastness which is expected of reactive dyes, include excellent light-fastness and acid and alkaline perspiration fastness.

We claim as our invention:

1. A compound of the formula

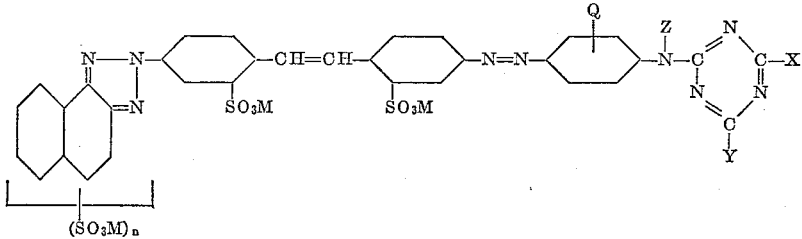

wherein $n$ is a numeral from 1 to 3, M is an alkali metal, Q is a non-ionic substituent of the group consisting of H, Cl, alkyl and O-alkyl, the alkyls being radicals of 1 to 4 C-atoms; Z is a radical of the group consisting of methyl and ethyl; X is a halogen atom of the group consisting of Cl and Br; Y is a member of the group consisting of Cl, Br, O-alkyl, S-alkyl, primary amino, monoalkylamino, dialkylamino, monoalkanolamino, dialkanolamino, arylamino, N-alkyl-arylamino, and arylamino and N-alkyl-arylamino radicals bearing water-solubilizing groups, the alkyls and alkanols aforementioned being radicals of 1 to 4 C-atoms each and the aryls being aromatic radicals of not more than 10 C-atoms in their cyclic structure.

2. A compound as in claim 1, wherein Y is an aromatic substituent having not more than 10 C-atoms in its cyclic structure and being linked to the triazine radical through the grouping NH.

3. A compound as in claim 1, wherein Y is an arylamino radical of not more than 10 C-atoms in its cyclic structure and being linked to the triazine radical through the N-atom of its amino group.

4. A compound as in claim 1, wherein Y is a sulfonated arylamino radical of not more than 10 C-atoms in its cyclic structure and being linked to the triazine radical through the N-atom of its amino group.

5. The compound of the formula

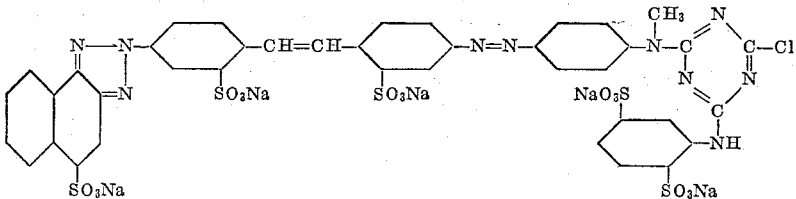

References Cited in the file of this patent

UNITED STATES PATENTS

| | | |
|---|---|---|
| 1,667,312 | Fritzsche et al. | Apr. 24, 1928 |
| 2,696,486 | Gunst | Dec. 7, 1954 |
| 2,795,576 | Fasciati | June 11, 1957 |
| 2,795,577 | Feeman | June 11, 1957 |
| 2,860,129 | Gunst | Nov. 11, 1958 |
| 2,873,269 | Fasciati et al. | Feb. 10, 1959 |
| 2,951,071 | Tilley | Aug. 30, 1960 |
| 2,951,072 | Tilley et al. | Aug. 30, 1960 |

OTHER REFERENCES

Gilman: "Organic Chemistry," volume III, pages 293–294.